US008078572B2

(12) United States Patent
Dorum et al.

(10) Patent No.: US 8,078,572 B2
(45) Date of Patent: Dec. 13, 2011

(54) SYSTEM AND METHOD FOR UPDATING A GEOGRAPHIC DATABASE USING SATELLITE IMAGERY

(75) Inventors: Ole Henry Dorum, Chicago, IL (US);
John Hanson, Citrus Heights, CA (US);
Lawrence M. Kaplan, Northbrook, IL (US)

(73) Assignee: NAVTEQ North America, LLC, Chicago, IL (US)

( * ) Notice: Subject to any disclaimer, the term of this patent is extended or adjusted under 35 U.S.C. 154(b) by 604 days.

(21) Appl. No.: 12/154,197

(22) Filed: May 21, 2008

(65) Prior Publication Data
US 2008/0228826 A1    Sep. 18, 2008

Related U.S. Application Data

(63) Continuation of application No. 10/795,635, filed on Mar. 8, 2004, now Pat. No. 7,406,482, which is a continuation of application No. 09/691,308, filed on Oct. 18, 2000, now Pat. No. 6,873,998.

(51) Int. Cl.
*G06F 7/00* (2006.01)
*G06F 17/00* (2006.01)
(52) U.S. Cl. ......... 707/603; 707/690; 707/918; 701/200
(58) Field of Classification Search ................ 707/802, 707/603, 690, 918; 701/200, 208, 117, 301
See application file for complete search history.

(56) References Cited

U.S. PATENT DOCUMENTS

| 5,099,331 | A | | 3/1992 | Truong ......................... 358/183 |
| 5,381,338 | A | | 1/1995 | Wysocki et al. ............... 701/207 |
| 5,596,494 | A | | 1/1997 | Kuo ................................. 702/2 |
| 5,636,122 | A | | 6/1997 | Shah et al. ..................... 701/207 |
| 5,646,844 | A | * | 7/1997 | Gudat et al. ................... 701/208 |
| 5,740,429 | A | * | 4/1998 | Wang et al. ........................ 1/1 |
| 5,758,313 | A | | 5/1998 | Shah et al. ..................... 701/208 |
| 5,760,742 | A | * | 6/1998 | Branch et al. .................. 342/457 |
| 5,832,116 | A | | 11/1998 | Rezzouk ......................... 382/119 |
| 5,864,632 | A | | 1/1999 | Ogawa et al. .................. 382/113 |
| 5,884,216 | A | | 3/1999 | Shah et al. ..................... 701/207 |

(Continued)

FOREIGN PATENT DOCUMENTS
JP        10241093 A  *  9/1998

OTHER PUBLICATIONS

Washington Post Company, Traffic, Copyright 1999, <http://www.washingtonpost.com/wp-srv/local/traffic/traffic.htm>.

(Continued)

*Primary Examiner* — Giovanna Colan
(74) *Attorney, Agent, or Firm* — Jon D. Shutter; Frank J. Kozak; Adil M. Musabji

(57) ABSTRACT

A reporting program and system for updating a master copy of a geographic database is disclosed. According to the method and system, reports are obtained that relate to data contained in a geographic database. Satellite images of the geographic locations represented by the data in the reports are obtained. The satellite images are analyzed to confirm a need to make changes to the master copy of the geographic database based on the reports. After confirming the need to make the changes, the master copy of the geographic database is updated.

23 Claims, 3 Drawing Sheets

U.S. PATENT DOCUMENTS

| | | | | |
|---|---|---|---|---|
| 5,893,093 | A * | 4/1999 | Wills | 1/1 |
| 5,922,040 | A * | 7/1999 | Prabhakaran | 701/117 |
| 6,047,234 | A * | 4/2000 | Cherveny et al. | 701/200 |
| 6,138,072 | A | 10/2000 | Nagai | 701/207 |
| 6,198,431 | B1 * | 3/2001 | Gibson | 342/357.57 |
| 6,253,151 | B1 | 6/2001 | Ohler et al. | 701/208 |
| 6,317,081 | B1 | 11/2001 | Stilp | 342/387 |
| 6,339,745 | B1 | 1/2002 | Novik | 701/208 |
| 6,397,143 | B1 | 5/2002 | Peschke | 701/208 |
| 6,405,132 | B1 * | 6/2002 | Breed et al. | 701/301 |
| 6,470,265 | B1 * | 10/2002 | Tanaka | 701/208 |
| 6,664,922 | B1 * | 12/2003 | Fan | 342/357.64 |
| 6,680,694 | B1 * | 1/2004 | Knockeart et al. | 342/357.31 |
| 6,681,231 | B1 * | 1/2004 | Burnett | 1/1 |
| 6,718,258 | B1 * | 4/2004 | Barton | 701/200 |
| 6,732,077 | B1 * | 5/2004 | Gilbert et al. | 704/270 |
| 7,024,307 | B2 * | 4/2006 | Ito et al. | 701/208 |
| 7,080,018 | B1 * | 7/2006 | Fox et al. | 705/14.5 |

OTHER PUBLICATIONS

Heres et al., GDF a proposed standard for digital road maps to be used in car navigation system, 1989, <http://www.ertico.com/links/gdf/gdfpub/gdfpcon.htm>.

Fowler, Sources of Satellite Imagery, Copyright 1999, <http://ourworld.compuserve.com/homepages/mjff/sources.htm>.

Ohihof, T., Emge, T., Reinhardt, W., Leukert, K., Heipke, C., Pakzad, "Generation and Update of VMap Data Using Satellite and Airborne Imagery", International Archives of Photogrammetry and Remote Sensing, vol. XXXIII, Part B4, Amsterdam (Jul. 16, 2000).

* cited by examiner

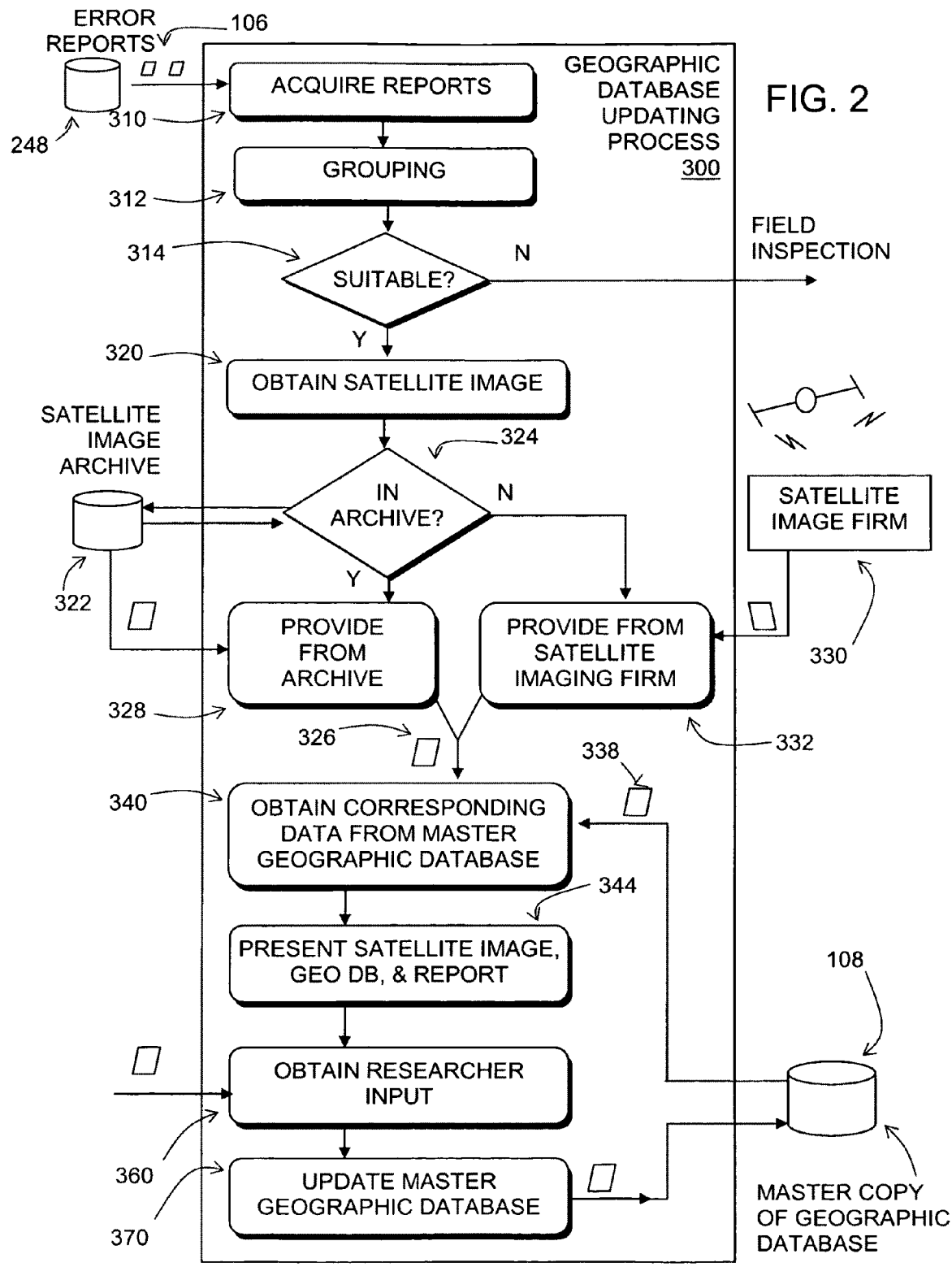

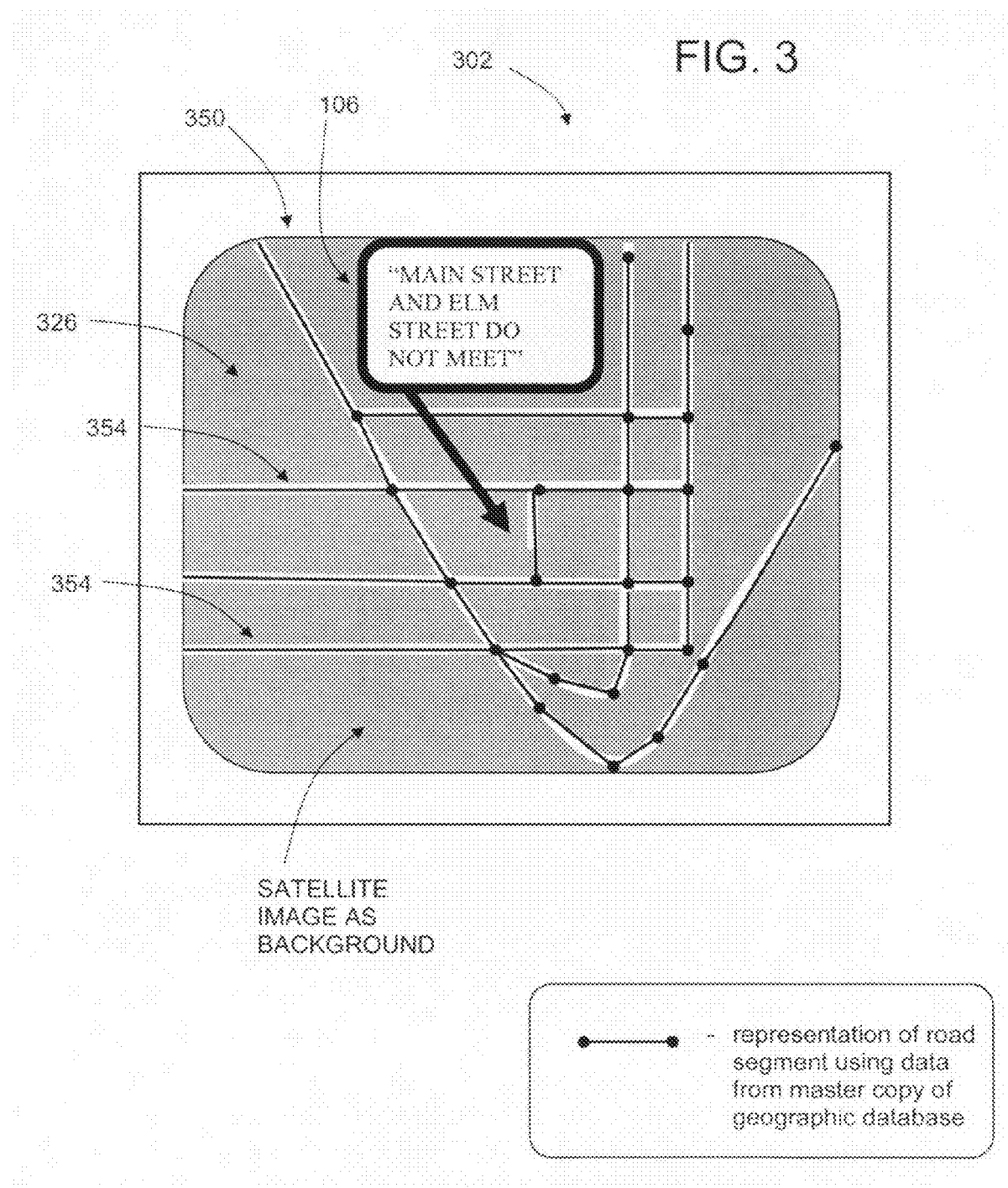

SYSTEM AND METHOD FOR UPDATING A GEOGRAPHIC DATABASE USING SATELLITE IMAGERY

The present application is a continuation of application Ser. No. 10/795,635 filed Mar. 8, 2004 now U.S. Pat. No. 7,406,482 which was a continuation of Ser. No. 09/691,308 filed Oct. 18, 2000, now U.S. Pat. No. 6,873,998, the entire disclosures of which are incorporated herein by reference.

BACKGROUND OF THE INVENTION

The present invention relates to a process for updating a geographic database and more particularly, the present invention relates to a process and system that uses satellite imagery for verifying and processing updates to a master copy of a geographic database.

Geographic databases have various uses. Geographic databases are used in in-vehicle navigation systems, personal computers, networked computing environments, and various other kinds of platforms, as well as on the Internet. Geographic databases are used with various kinds of applications to provide various functions including map display, route calculation, route guidance, truck fleet deployment, traffic control, electronic yellow pages, emergency services, and so on.

In order to provide these kinds of functions, a geographic database includes data that represent geographic features in a covered geographic region. Geographic databases include details about represented geographic features, such as the geographic coordinates of roads in a geographic region, speed limits along the road segments, locations of stop lights, turn restrictions at intersections of roads, address ranges, street names, and so on. Geographic databases may also include information about points of interest in covered regions. Points of interest may include restaurants, hotels, airports, gas stations, stadiums, police stations, and so on.

Collecting information for a geographic database is a significant task. According to one method, technicians (referred to herein as "researchers") are assigned the task of collecting data for a geographic database. Each researcher may physically travel throughout an assigned area and record information about observed geographic features. While in the field, the researcher may record the observed information by physically writing on a printed copy of a map. For example, the researcher may write a description about an attribute of a geographic feature adjacent to the representation of the geographic feature on the map. Alternatively, the researcher may use a portable computer with a data collection program, as described in U.S. patent application Ser. No. 09/256,389 or Ser. No. 09/335,122, the entire disclosures of which are incorporated herein by reference. After the data are collected in the field, the researcher uses a computer program to enter data to a main (or master) copy of the geographic database. Working from the marked-up printed copy of the map, the researcher makes additions and/or changes to the data in the master geographic database to reflect the actual geographic features observed by the researcher while out in the field.

Beyond the initial effort involved in collecting data for a geographic database, there is a continuing need to update and check the data in the geographic database. Just like conventional printed maps, geographic databases become out-of-date. For example, new streets are constructed, street names change, traffic lights are installed, turn restrictions are added to existing roads, businesses change locations, road construction closes roads, detours are established, museum and restaurant hours change, etc. Thus, there exists a need to continue to collect updated information for a geographic database and then add the updated information to the geographic database.

One useful way to collect information for updating the geographic database is to obtain feedback from end users who have navigation systems or who use on-line sites that use copies of the geographic database to provide navigation-related features. These end users may discover that certain geographic data are not correct or are inaccurate. A geographic database developer can take advantage of this situation by providing a means by which end users can report the database errors or inaccuracies that they encounter. The error reporting system also provides an opportunity for generating good will between the geographic database developer and the end user End users can report perceived errors by telephone or by the Internet. An example of an error reporting Internet site can be found at www.navtech.com/database/data_driver.html. In addition, error reporting systems are disclosed in the copending patent application Ser. Nos. 09/590,213 and 09/602,127, the entire disclosures of which are incorporated by reference herein.

After receiving a report from an end user about a perceived error or inaccuracy in the geographic database, the geographic database developer confirms that the error exists and then determines the correct information to be added to the master copy of the database. Sometimes the error perceived by the end user is not due to incorrect data in the geographic database, but instead is due to other factors, such as an error in the navigation system software. In some cases, a geographic database researcher may have to travel to the location of the perceived error to obtain the correct information. After confirming reports from end users, the geographic database researcher can make corrections to a master copy of the geographic database, which is then used to make new, updated versions of geographic databases for use in navigation systems or by on-line provider of navigation-related services.

Although the process works well, there still exists room for improvement. For example, it is relatively time-consuming and expensive to have a geographic database researcher travel out to the field to check each reported error. Accordingly, there exists a need for improved ways to handle the reporting of errors in the geographic database and the updating of the master copy of the geographic database.

SUMMARY OF THE INVENTION

To address these and other objectives, the present invention comprises a reporting program and system for updating a master copy of a geographic database. According to the method and system, reports are obtained that relate to data contained a geographic database. Satellite images of the geographic locations represented by the data in the reports are obtained. The satellite images are analyzed to confirm a need to make changes to the master copy of the geographic database based on the reports. After confirming the need to make the changes, the master copy of the geographic database is updated.

BRIEF DESCRIPTION OF THE DRAWINGS

FIG. 2 is a flow chart of steps performed by the system of FIG. 1.

FIG. 3 illustrates the display screen of the of the geographic database researcher's workstation shown in FIG. 1.

DETAILED DESCRIPTION OF THE PRESENTLY PREFERRED EMBODIMENTS

Figure 1:
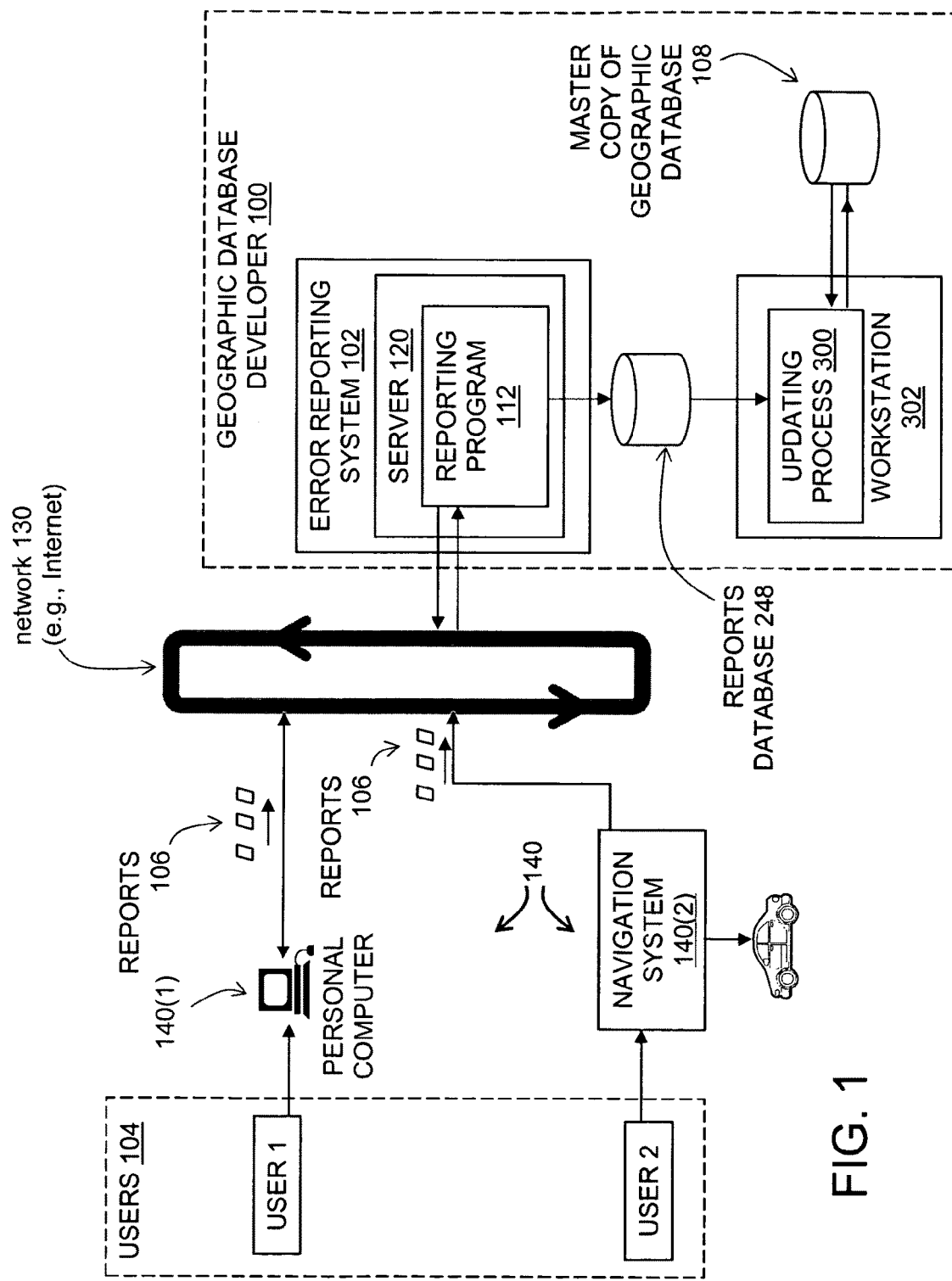
FIG. 1 is a block diagram of a first embodiment of a system for updating a geographic database.

Referring to FIG. 1, a geographic database developer 100 operates an error reporting system 102. The error reporting system 102 enables end users 104 (e.g., persons who obtain navigation-related or map-related services from navigation systems or from on-line providers of navigation services) to submit reports 106 relating to perceived errors that the end users discover in the geographic data used in the navigation-related or map-related services that are obtained from navigation systems or from on-line providers of navigation services. The reports 106 are used by the geographic database developer 100 to update a master copy 108 of the geographic database. After being updated, the master copy 108 of the geographic database is used to make derived geographic database products that are subsequently used in navigation systems or by on-line navigation services providers.

The error reporting system 102 may provide several different ways that the end users 104 can use to report errors. These ways include an on-line reporting program 112. The error reporting system 102 may include other ways to report errors, such as telephone-based error reporting and mail-based error reporting, described below.

FIG. 1 shows the on-line error reporting program 112 operated by the geographic database developer 100. The on-line error reporting program 112 is located on a server 120 that is connected to a network 130, such as the Internet. End users 104 operate computing platforms 140 to access the on-line error reporting program 112. The computing platforms 140 used by the end users 104 can be any type of device or system that is able to access the server 120 over the network 130. For example, the computing platforms 140 include personal computers 140(1) and vehicle navigation systems 140(2). The computing platforms 140 may also include other types of computing devices or systems, such as personal digital assistants.

The computing platforms 140 used by the end users 104 include appropriate software to access the server 120 over the network 130. If an end user uses a personal computer 140(1) to access the server 120, the on-line reporting program 112 may be accessed using an Internet browser. Other communications software may also be used.

As stated above, the end users 104 access the on-line reporting program 112 in order to make reports about geographic data. In particular, the on-line reporting program 112 may be used by the geographic database developer 100 to obtain reports from the end users 104 about perceived errors or inaccuracies in the geographic data used in the navigation systems of the end users or by on-line provider sites that are used by the end users to obtain navigation-related and map-related services. The perceived errors or inaccuracies can be of any type and may be encountered in various different ways. One of the ways that end users can encounter perceived errors or inaccuracies is during operation of in-vehicle navigation systems. For example, while being guided to follow a route to a destination, a navigation system may provide the end user with incorrect, inaccurate or confusing guidance. According to this example, the navigation system may advise the end user to 'TURN LEFT AT THE NEXT INTERSECTION" but the next intersection has a sign that prohibits left turns. According to another example, the navigation system may identify a street by a wrong name.

There are various reasons why a navigation system may provide incorrect, inaccurate or confusing guidance to an end user. One possible cause is that the geographic data used by the navigation system may be incorrect. The geographic data may be incorrect because of an error made when the data were being collected. Alternatively, the geographic data used by the navigation system may be incorrect because the physical feature represented by the geographic data changed since the time the geographic data used by the end user's system was collected.

Another possible cause for an end user receiving incorrect, inaccurate or confusing guidance from a navigation system can be an error in the software programming in the navigation system. In this case, the geographic data may be correct but the end user receives incorrect, inaccurate or confusing guidance because the software programming the navigation system does not use the geographic data properly. For example, if the navigation system software determines a vehicle's position incorrectly, a wrong street name may be provided thereby giving the end user the impression that the geographic data are incorrect when in fact the navigation programming caused the error.

Another reason why a navigation system may provide incorrect or confusing guidance is that the geographic data used by the navigation system may not include the attributes that are necessary to provide better instructions. For instance, the data representing roads located in some geographic areas may not contain one-way street information because this type of information has not yet been collected for those areas. Alternatively, the software programming in the navigation system may not consider one-way streets when providing driving directions.

As mentioned above, navigation-related and map-related services can also be obtained from on-line navigation services providers. End users may access on-line navigation services provider sites from their own personal computers or other platforms or appliances to obtain navigation-related and map-related services. An end user using an on-line navigation services provider site to obtain navigation-related and map-related services may also encounter incorrect, inaccurate or confusing information. On-line navigation services providers may use the same or similar geographic data and software programming that are used in vehicle navigation systems. Therefore, on-line navigation services provider sites may give incorrect, inaccurate or confusing navigation-related or map-related information for the same reasons as explained above in connection with vehicle navigation systems.

Regardless of the cause of a perceived error, the reporting program 112 provides a means by which a report about the perceived error can be obtained from an end user. As stated above, the end users 104 operate computing platforms 140 to access the reporting program 112. The computing platform 140 used by an end user to access the reporting program 112 may not necessarily be the same computing platform that the end user was using when the navigation-related or map-related information containing the perceived error was obtained. For example, an end user may perceive an error with the geographic data used by his/her vehicle navigation system while driving in his/her vehicle, but then accesses the reporting program later at home using his/her personal computer with Internet access.

When the end user accesses the reporting program 112, the reporting program 110 presents the user with the option of making a report about a geographic database. When the end user chooses this option, the reporting program 112 may request the end user to identify the version of the geographic database to which the report pertains. After the end user supplies information identifying the version of the database, the reporting program 112 presents the end user with a means to describe the error. The reporting program 112 may present the end user with a means to provide text input. The reporting program 112 may also provide the end user with a graphical interface so that the end user can indicate a change graphically, e.g., by drawing on a map.

After the end user has completed the report, the reporting program 112 saves the end user's input in a report file database 248. The data in the report file database 248 are used in a geographic database updating process 300. The geographic database updating process 300 is performed by the geographic database developer. According to one embodiment, the process 300 is performed by a technician (i.e., a researcher) working for the geographic database developer 100. The researcher works on a computer workstation 302 which may be any suitable networked computer hardware platform, such as a personal computer, a terminal, etc.

FIG. 2 show the steps performed by the geographic database updating process 300. The steps in FIG. 2 may be performed by the researcher or alternatively, the steps may be performed by a computer program with input from the researcher.

The geographic database updating process 300 receives the data from the reports database 248 (Step 310). In one embodiment, a grouping step is performed (Step 312). According to this embodiment, a relatively large number of separate reports are analyzed to determine whether a significant number of them all relate to the same location. In a preferred embodiment, the grouping step is performed by a software routine that is part of the geographic database updating process. According to this embodiment, each report 106 identifies the geographic location of the reported error. The software routine identifies all the reports that relate to the same, or substantially the same, location. If a number of reports all relate to the same location, these reports may all relate to the same problem and therefore may be processed together. Also, if a number of reports all relate to the same area, they may be assigned a higher priority than reports that relate to isolated areas.

According to another step of the process 300, the subject matter of each report (or a grouping of more than one report) is analyzed to determine whether the type of error being reported can be confirmed using satellite imagery (Step 314). Some types of reported errors, such as addresses, street names, business names, or sign text, may not be suitable for confirmation by satellite imagery. Other types of reported errors are suitable for confirmation by satellite imagery. The types of reported errors that are suitable for confirmation by satellite imagery include, but are not limited to, road geometry, placement of roadway dividers, the number of roadway lanes, roadway lane widths, roadway traffic direction restrictions (e.g., one-way streets), turn restrictions along a road, whether a road is paved, road connectivity, the presence and locations of overpasses, bridges, tunnels, ramps, turn lanes, frontage roads, railroad tracks, railroad terminals, tollways, toll booths, road construction, train stations, ferries, border crossings, marinas, certain types of points of interest (e.g., amusement parks, golf courses, and stadiums), certain types of intersections (e.g., roundabouts), and possibly functional classes of roads. In addition, satellite imagery can also be used to confirm errors about types of geographic features, such as lakes, rivers, parks, and so on.

If a report relates to a type of error that is not suitable for confirmation by satellite imagery, the report is designated for confirmation by field inspection. These reports are forwarded to researchers who will travel out to the locations of the reported errors, confirm the errors, determine the appropriate corrections to make to the master copy of the geographic database, and then make the appropriate corrections.

After any grouping of reports occurs and any reports that are not suitable for confirmation by satellite imagery are excluded, a satellite image of the location of each of the reported errors is obtained (Step 320). According to one embodiment, the satellite images are high-resolution images that have an accuracy of approximately 1 meter.

An archive 322 of previously obtained satellite images is reviewed to determine whether a recently obtained satellite image of the area that contains the reported error is available (Step 324). The archive 322 may be maintained by the geographic database developer 100. The archive 322 may be stored on a server that is accessible to the developer's workstation (302 in FIG. 1). In the archive 322, each satellite image is associated with a date. The date indicates when the satellite image was taken. The date of the satellite image is compared to an expiration schedule. The expiration schedule relates a type of error with an age of a satellite image. For some types of reported errors, the process 300 requires that the satellite image be relatively new, e.g., less than 30 days old, whereas for other types of reported errors, a relatively older image (e.g., up to 12 months) will be suitable.

If a satellite image is available from the database developer's archive 322 and meets the requirements for being recent enough, the satellite image 326 is provided to the process 300 (Step 328). If the database developer's archive 322 does not have a satellite image that contains the area of the reported error or if the satellite image in the archive 322 is too old, a new satellite image is obtained from a satellite image firm 330 (Step 332). (The satellite image firm may be a commercial firm, such as Earthwatch.) The researcher may need to specify the area for the new satellite image or the area may be automatically extracted from the report by the software included in the process 300. The satellite image firm 330 may have the image taken. Alternatively, the satellite image firm 330 may be able to provide the image from its own archive if the image is new enough to meet the requirements of the database developer's expiration schedule. The satellite image firm may deliver the image to the researcher electronically, e.g., on-line via a network, or may send an electronic or analog image by mail.

The process 300 obtains data 338 from the master copy 108 that relate to the area of the reported error (Step 340). The data 338 from the master copy 108 are presented to the database developer researcher, along with the satellite image 326 and the report (Step 344). The data 338 from the master copy 108, the satellite image 326 and the report may be presented to the researcher on a display screen of the workstation (302 in FIG. 1) used by the researcher to perform the updating process 300.

The data 338, the satellite image 326 and the report may be presented to the researcher in various different ways. In one embodiment, the satellite image 326 is presented to the researcher as a background and the data 338 from the master copy of the geographic database 108 are overlaid on the image 326. The report may be displayed in a window on the display screen. By overlaying the data 338 from the master copy of the database over the satellite image 326, the researcher can determine whether the data 338 from the master copy of the geographic database correctly represent the actual geographic features. The information from the report can be used to identify the perceived error and also to indicate what the end user perceived the error to be.

FIG. 3 shows an example of a display screen 350 of the researcher's workstation 302. Shown as a background on the display screen 350 is the satellite image 326. The satellite image 326 shows portions of several roads. Overlaid on the satellite image 326 are representations of several road segments 354. The representations of road segments 354 are formed using the data 338 from the master copy of the geographic database.

To assist the researcher, the position of the reported error may be located at the center of the display screen 350. The position of the reported error may be highlighted or a square, circle, or other shape may be generated about the position of the reported error. Alternatively, the corresponding latitude and longitude may be displayed as the researcher moves a cursor over the image so that the researcher can find the position of the reported error.

In an alternative embodiment, instead of showing the representations of geographic features from the data in the geographic database as an overlay on the satellite image, the representations of geographic features from the data in the geographic database can be shown side-by-side with the satellite image on the display screen of the researcher's workstation.

Referring again to FIG. 2, based on the satellite image 326, and possibly the report 106, the researcher inputs a correction to the master copy of the geographic database (Step 360). The input may relate to road geometry, i.e., that a road is not where the database represents it to be. The input may relate to lane dividers, number of roadway lanes, roadway lane widths, roadway traffic direction restrictions (e.g., one-way streets), turn restrictions along a road, whether a road is paved, or numerous other changes. In addition, satellite imagery can also be used to confirm changes about other types of geographic features, such as lakes, rivers, parks, or recreational areas (including golf courses, stadiums, and so on). Based on the input from the researcher, the master copy of the geographic database 108 is updated (Step 370). The updated master copy of the geographic is then used to make updated versions of derived geographic database products that are used in end users' navigation systems and by on-line providers of navigation-related and map-related services.

If a new satellite image was obtained (instead of using an image from the database developer's archive), a copy of the new satellite image is stored in the archive for possible future use.

Alternatives

In the embodiment described above, satellite images were obtained, as needed, to confirm reported errors received from end users. In an alternative embodiment, a complete collection of satellite images can be obtained for the entire coverage area of the master copy of the geographic database (or portions thereof). These images can be stored in an archive maintained by the geographic database developer. Then, when an image is needed to confirm a reported error, the image can be obtained immediately from the archive. Some or all the images stored in the archive can be periodically updated.

In one embodiment, a grid is defined that overlays the entire coverage area of the master copy of the geographic database. Then, when a satellite image is needed, the satellite image is obtained so that it corresponds to a cell of the grid. In this manner, satellite images are not obtained that substantially overlap each other, thereby making the process of obtaining satellite images more efficient.

As mentioned above, the geographic database developer operates a reporting system 102 that enables end users to make reports about perceived errors in the geographic data. In the embodiment described above, the reporting system 102 includes an on-line reporting program (112 in FIG. 1) that enables end users to make reports via a network using their computer platforms. In an alternative embodiment, end users can make reports about geographic data by means other than over a network. For example, an end user may make a report by telephone. According to this alternative, the end user uses a telephone to report an error to a human operator. The human operator obtains the necessary information from the end user and submits a report which is then handled in a manner similar to the reports that are submitted using the on-line reporting program (102 in FIG. 1), described above. Alternatively, the end user uses a telephone to report an error to a telephone reporting program that prompts the end user to make a report using the keys of the telephone. According to another alternative, the end user uses a telephone to dictate a description of the error on a recording device (such as an answering machine) that is operated by the database developer. An employee of the database developer then listens to the message and generates a report that is handled in a manner similar to the reports that are submitted using the on-line reporting program.

In another alternative, the end user may submit a report by mail. A report submitted by mail may be transcribed into electronic form and processed in the manner described above.

It is intended that the foregoing detailed description be regarded as illustrative rather than limiting and that it is understood that the following claims including all equivalents are intended to define the scope of the invention.

We claim:

1. A system for identifying corrections for a geographic database comprising:
    an error reporting program run on a server allowing an end user of the geographic database to submit a report of a perceived error in how data contained in the geographic database represents a geographic feature, wherein the report by the end user indicates a geographic location of the perceived error,
    a report database storing the report submitted by the end user,
    a computer workstation capable of obtaining and evaluating the report, wherein a satellite image containing the geographic feature of the report is presented on a display of the computer workstation, while the satellite image is presented on the display, presenting the geographic feature as represented by data contained in the geographic database on the display, wherein the satellite image is analyzed to determine a correction to the data that represents the geographic feature; and
    a master copy of the geographic database, wherein the correction is used to update the master copy of the geographic database.

2. The system of claim 1 wherein the report indicates a version of the geographic database to which the report pertains.

3. The system of claim 1 wherein the report provides information regarding the perceived error.

4. The system of claim 1 wherein the report is also presented on said display of the computer workstation.

5. The system of claim 1 wherein the satellite image for display is identified using a geographic location provided in the report.

6. The system of claim 1 wherein the geographic feature as represented by data contained in the geographic database is presented as an overlay on the satellite image being displayed at the workstation.

7. The system of claim 1 wherein the satellite image and the geographic feature as represented by data contained in the geographic database are presented side-by-side on the display of the workstation.

8. A computer implemented method for identifying corrections for a geographic database comprising:
   obtaining a report from an end user about an error in data that represents a geographic feature, wherein the report includes a drawing of the error on a map;
   obtaining an image including said geographic feature of said report;
   displaying the image at a computer workstation;
   while displaying the image, displaying data contained in the geographic database that represents the geographic feature of the report;
   evaluating the image to determine a correction to the data that represents said geographic feature; and
   updating the geographic database with the correction.

9. The method of claim 8 wherein the report is obtained from a report database containing reports submitted by end users of the geographic database.

10. The method of claim 8 wherein the report contains information indicating a location of the geographic feature.

11. The method of claim 8 wherein the report relates to a road.

12. The method of claim 8 wherein displaying data contained in the geographic database that represents the geographic feature of the report shows the geographic feature as represented by data contained in the geographic database on the computer workstation.

13. The method of claim 8 further comprising:
   indicating a position on the image being displayed wherein said position corresponds to a location of said geographic feature of the report.

14. The method of claim 8 further comprising:
   displaying the report on the computer workstation.

15. A method for updating a master copy of a geographic database comprising:
   obtaining a report indicating an error in data that represent a geographic feature from an end user of the geographic database, wherein the report by the end user indicates a geographic location of the error;
   displaying an image at a computer workstation, wherein the image shows the geographic feature indicated in said report;
   while displaying the image, displaying said geographic feature as represented by data contained in the master copy of a geographic database at the computer workstation;
   analyzing the image to determine how to update the master copy of the geographic database; and
   updating the master copy of the geographic database.

16. The method of claim 15 wherein the report indicates a version of the geographic database to which the report pertains.

17. The method of claim 15 further comprising:
   displaying the report on the computer workstation.

18. The method of claim 15 wherein the geographic feature as represented by data contained in the geographic database is displayed as an overlay on the image being displayed at the workstation.

19. The method of claim 15 wherein the image and the geographic feature as represented by data contained in the geographic database are presented side-by-side on the computer workstation.

20. The method of claim 15 further comprising:
   indicating a position on the image being displayed wherein said position corresponds to a location of said geographic feature of the report.

21. A system for identifying corrections for a geographic database comprising:
   an error reporting program run on a server allowing an end user of the geographic database to submit a report about an error in data that represents a geographic feature, wherein the report by the end user indicates a geographic location of the error;
   a computer workstation capable of obtaining and evaluating the report, wherein an image containing the geographic feature of the report is presented on a display of the computer workstation, while the image is presented on the display, presenting the geographic feature as represented by data contained in the geographic database on the display, wherein the image is analyzed to determine a correction to the data that represents the geographic feature; and
   a master copy of the geographic database, wherein the correction is used to update the master copy of the geographic database.

22. The system of claim 21 wherein the report includes a textual description of the error.

23. The system of claim 21 wherein the geographic location of the error is provided with a drawing on a map.

* * * * *